US012759522B2

(12) United States Patent
Jeong

(10) Patent No.: US 12,759,522 B2
(45) Date of Patent: Oct. 13, 2026

(54) ELECTRIC BRAKE SYSTEM

(71) Applicant: HL MANDO CORPORATION, Gyeonggi-do (KR)

(72) Inventor: Hyojin Jeong, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 479 days.

(21) Appl. No.: 18/270,205

(22) PCT Filed: Dec. 29, 2021

(86) PCT No.: PCT/KR2021/020215
§ 371 (c)(1),
(2) Date: Jun. 29, 2023

(87) PCT Pub. No.: WO2022/146049
PCT Pub. Date: Jul. 7, 2022

(65) Prior Publication Data
US 2024/0109526 A1 Apr. 4, 2024

(30) Foreign Application Priority Data
Dec. 29, 2020 (KR) ........................ 10-2020-0185708

(51) Int. Cl.
*B60T 13/74* (2006.01)
*B60T 13/68* (2006.01)
*B60T 7/04* (2006.01)

(52) U.S. Cl.
CPC .......... *B60T 13/745* (2013.01); *B60T 13/686* (2013.01); *B60T 7/042* (2013.01); *B60T 2270/402* (2013.01)

(58) Field of Classification Search
CPC ...... B60T 2270/402; B60T 7/04; B60T 7/042; B60T 13/142–147; B60T 13/68–686; B60T 13/745
See application file for complete search history.

(56) References Cited

U.S. PATENT DOCUMENTS

2014/0028084 A1 1/2014 Biller et al.
2019/0366997 A1* 12/2019 Jeong .................... B60T 13/167
(Continued)

FOREIGN PATENT DOCUMENTS

JP 2007-216850 8/2007
KR 10-2019-0136210 12/2019
(Continued)

OTHER PUBLICATIONS

International Search Report for PCT/KR2021/020215 mailed on Apr. 13, 2022 and its English Machine Translation by the WIPO (now published as WO 2022/146049).
(Continued)

*Primary Examiner* — David R Morris
(74) *Attorney, Agent, or Firm* — WOMBLE BOND DICKINSON (US) LLP

(57) ABSTRACT

An electric brake system is disclosed. The electric brake system according to an embodiment of the present invention comprises: a first block in which a mechanical part mechanically operated in connection with a brake pedal is disposed; a second block in which an electronic part electronically operated and controlled by an electronic control unit is disposed; an emergency module which is operated when the operation of the electronic part is disabled to assist in providing hydraulic pressure; and a connection line which hydraulically connects the first block, the second block, and the emergency module to each other. The first block, the second block, and the emergency module can be installed at positions spaced apart from each other in a vehicle, and thus the mountability of the brake system and the degree of design freedom of the vehicle can be improved.

17 Claims, 7 Drawing Sheets

(56) References Cited

U.S. PATENT DOCUMENTS

| | | | | |
|---|---|---|---|---|
| 2019/0367000 | A1* | 12/2019 | Lee | B60T 13/745 |
| 2022/0176928 | A1* | 6/2022 | Kim | B60T 8/326 |
| 2023/0294651 | A1* | 9/2023 | Cho | B60T 17/221 |

FOREIGN PATENT DOCUMENTS

| | | | | |
|---|---|---|---|---|
| KR | 10-2020-0016343 | | 2/2020 | |
| KR | 10-2020-0108542 | | 9/2020 | |
| WO | WO-2020184967 | A1 * | 9/2020 | B60T 13/686 |

OTHER PUBLICATIONS

Written Opinion of the International Searching Authority for PCT/KR2021/020215 mailed on Apr. 13, 2022 and its English Machine Translation by the WIPO (now published as WO 2022/146049).

* cited by examiner

ELECTRIC BRAKE SYSTEM

TECHNICAL FIELD

The present invention relates to an electric brake system, and more particularly, to an electric brake system for generating a braking force using an electrical signal in response to a displacement of a brake pedal.

BACKGROUND ART

A In vehicles, a brake system for braking is necessarily installed, and various types of brake systems have been suggested for the safety of drivers and passengers.

In brake systems in the related art, a method in which, when a driver presses a brake pedal, hydraulic pressure required for braking is supplied to a wheel cylinder using a mechanically connected booster is mainly used. However, with the increased market demands for implementation of various braking functions in a detailed response to a vehicle operating environment or for autonomous driving of vehicles, electric brake systems including a hydraulic pressure supply device that receive a driver's willingness to brake as an electrical signal from a pedal displacement sensor for detecting a displacement of a brake pedal when the driver presses the brake pedal and supply hydraulic pressure required for braking to a wheel cylinder have recently been widely spread.

Such an electric brake system generates and provides an electrical signal when a driver operates a brake pedal in a normal operating mode or it is determined that braking is required during autonomous driving of a vehicle, and the hydraulic pressure supply device is electrically operated and controlled based on the electrical signal, thereby generating hydraulic pressure required for braking and transmitting the hydraulic pressure to the wheel cylinder. As described above, the electric brake system is electrically operated and controlled and thus the electric brake system is able to effectively implement various braking situations, but when a malfunction occurs due to a failure of one component element or the like, the hydraulic pressure required for braking is not stably generated, which may threaten the safety of occupants.

Accordingly, in the case where one component element is broken or out of control, the electric brake system enters an abnormal operating mode, and in this case, a mechanism in which a driver's brake pedal operation is directly linked to the wheel cylinder is required. That is, in the abnormal operating mode of the electric brake system, it is required that, when the driver applies a pressing force to the brake pedal, the hydraulic pressure required for braking is immediately generated and transmitted directly to the wheel cylinder.

Meanwhile, in mounting the electric brake system on a vehicle, there is a problem in that the degree of freedom in vehicle design is limited due to limitations in size and installation position of a system module. Accordingly, a method capable of efficiently installing a system module while maintaining braking performance of a vehicle is required.

Technical Problem

The present embodiment is directed to providing an electric brake system capable of implementing stable and effective braking in various operating situations.

The present embodiment is directed to providing an electric brake system capable of reducing the number of components and promoting miniaturization and lightweight of a product.

The present embodiment is directed to providing an electric brake system capable of improving the degree of freedom in vehicle design.

The present embodiment is directed to providing an electric brake system capable of easily and efficiently performing installation and arrangement in a vehicle.

The present embodiment is directed to providing an electric brake system capable of improving product assembly and productivity and reducing manufacturing costs of a product.

The present embodiment is directed to providing an electric brake system with improved performance and operational reliability.

Technical Solution

One aspect of the present invention provides an electric brake system including a first block in which a mechanical part mechanically operated in conjunction with a brake pedal is disposed, a second block in which an electronic part electronically operated and controlled by an electronic control unit is disposed, and which is disposed to be spaced apart from the first block, an emergency module operating when the electronic part is inoperative and providing hydraulic pressure to a wheel cylinder in an auxiliary manner, and a connecting line hydraulically connecting the first block, the second block, and the emergency module to each other, the mechanical part includes a master cylinder equipped with a main reservoir in which a pressurized medium is stored, a master piston connected to the brake pedal, and a master chamber whose volume is varied by a displacement of the master piston, the electronic part includes a hydraulic pressure supply device generating hydraulic pressure by operating a hydraulic piston by an electrical signal output corresponding to a displacement of the brake pedal or an electrical signal output from the electronic control unit, and a hydraulic pressure control unit equipped with a plurality of flow paths and valves to control the hydraulic pressure transmitted from the hydraulic pressure supply device to the wheel cylinder, and the emergency module includes a hydraulic pressure auxiliary device operating when the hydraulic pressure supply device is inoperative to provide the hydraulic pressure to the wheel cylinder.

The hydraulic pressure auxiliary device may include a first isolation valve and a second isolation valve allowing and blocking flows of the pressurized medium transmitted from the master cylinder and the hydraulic pressure supply device to a first wheel cylinder and a second wheel cylinder, respectively, a pump for pressurizing the pressurized medium, a motor for driving the pump, a first auxiliary hydraulic flow path for transmitting the pressurized medium pressurized by the pump to the first wheel cylinder, and a second auxiliary hydraulic flow path for transmitting the pressurized medium pressurized by the pump to the second wheel cylinder.

The hydraulic pressure auxiliary device may further include a first auxiliary dump flow path for discharging the pressurized medium applied to the first wheel cylinder and a second auxiliary dump flow path for discharging the pressurized medium applied to the second wheel cylinder.

The hydraulic pressure auxiliary device may further include a first support valve provided on the first auxiliary hydraulic flow path to control the flow of the pressurized medium and a second support valve provided on the second auxiliary hydraulic flow path to control the flow of the pressurized medium and a first discharge valve provided on the first auxiliary dump flow path to control the flow of the pressurized medium and a second discharge valve provided on the second auxiliary dump flow path to control the flow of the pressurized medium.

The hydraulic pressure control unit may include a first hydraulic circuit that controls hydraulic pressure transmitted to the first wheel cylinder and the second wheel cylinder, and a second hydraulic circuit that controls hydraulic pressure transmitted to a third wheel cylinder and a fourth wheel cylinder, and the connecting line may include a first connecting line connecting the master chamber and a front end of the first hydraulic circuit.

The electronic part may further include a pedal simulator, and the connecting line further may include a second connecting line connecting the master chamber and the pedal simulator.

The electronic part may further include a sub reservoir in which the pressurized medium is stored, and the connecting line may further include a third connecting line connecting the main reservoir and the sub reservoir.

The hydraulic pressure auxiliary device may be provided between the first and second wheel cylinders and the first hydraulic circuit.

The master cylinder may include a first master piston connected to the brake pedal, a first master chamber whose volume is varied by a displacement of the first master piston, a second master piston provided to be displaceable by hydraulic pressure of the first master chamber, and a second master chamber whose volume is varied by a displacement of the second master piston, the first connecting line may connect the first master chamber and the front end of the first hydraulic circuit, and the second connecting line may connect the second master chamber and a front end of the pedal simulator.

The connecting line may further include a fourth connecting line connecting an inlet of the pump and the first and second auxiliary dump flow paths to the third connecting line.

The electronic part may further include a dump controller provided between the hydraulic pressure supply device and the sub reservoir to control the flow of the pressurized medium.

The hydraulic pressure supply device may include a first pressure chamber provided in front of the hydraulic piston and a second pressure chamber provided behind the hydraulic piston, and the electronic part may further include a first sub reservoir flow path connecting the sub reservoir and the first pressure chamber and a second sub reservoir flow path connecting the sub reservoir and the second pressure chamber.

The dump controller may include a first dump valve provided on the first sub reservoir flow path, a second dump valve provided on the second sub reservoir flow path, and a third dump valve provided in parallel to the second dump valve on the second sub reservoir flow path.

The electronic part may further include a third sub reservoir flow path connecting the sub reservoir and a rear end of the first hydraulic circuit, and a fourth sub reservoir flow path connecting the sub reservoir and a rear end of the second hydraulic circuit.

The electronic part may further include a simulation flow path connected to a rear end of the pedal simulator and the simulation flow path may be connected to the sub reservoir by joining the fourth sub reservoir flow path.

The electronic part may further include a backup flow path connecting any one of the main reservoir and the sub reservoir to a front end of the second hydraulic circuit, a first cut valve provided in the first connecting line to control the flow of the pressurized medium, and a second cut valve provided on the backup flow path to control the flow of the pressurized medium.

The first hydraulic circuit may include a first inlet valve and a second inlet valve for controlling the flow of the pressurized medium supplied from the hydraulic pressure supply device to the first wheel cylinder and the second wheel cylinder, respectively, and a first outlet valve and a second outlet valve for controlling flows of the pressurized medium discharged from the first wheel cylinder and the second wheel cylinder, respectively, the second hydraulic circuit may include a third inlet valve and a fourth inlet valve for controlling the flow of the pressurized medium supplied from the hydraulic pressure supply device to the third wheel cylinder and the fourth wheel cylinder, respectively, and a third outlet valve and a fourth outlet valve for controlling the flow of the pressurized medium discharged from the third wheel cylinder and the fourth wheel cylinder, respectively, the pressurized medium discharged through the first and second outlet valves may be supplied to the third sub reservoir flow path, and the pressurized medium discharged through the third and fourth outlet valves may be supplied to the fourth sub reservoir flow path.

The first connecting line and the second connecting line may be provided as pipes having rigidity, and the third connecting line and the fourth connecting line may be provided as hoses having elasticity.

The first and second isolation valves may be provided as normal-open-type solenoid valves that are open in normal times and operate to be closed upon receiving an electrical signal.

The first and second support valves and the first and second discharge valves may be provided as normal-closed-type solenoid valves that are closed in normal times and operate to open upon receiving an electrical signal.

Advantageous Effects

An electric brake system according to the present embodiment can implement stable and effective braking in various operating situations of a vehicle.

An electric brake system according to the present embodiment can reduce the number of components and promote miniaturization and lightweight of a product.

An electric brake system according to the present embodiment can improve the degree of freedom in vehicle design.

An electric brake system according to the present embodiment can easily and efficiently perform installation and arrangement in a vehicle.

An electric brake system according to an embodiment of the present invention can improve product assembly and productivity and reduce manufacturing costs of a product.

An electric brake system according to the present embodiment can improve product performance and operation reliability.

MODES OF THE INVENTION

Figure 1:
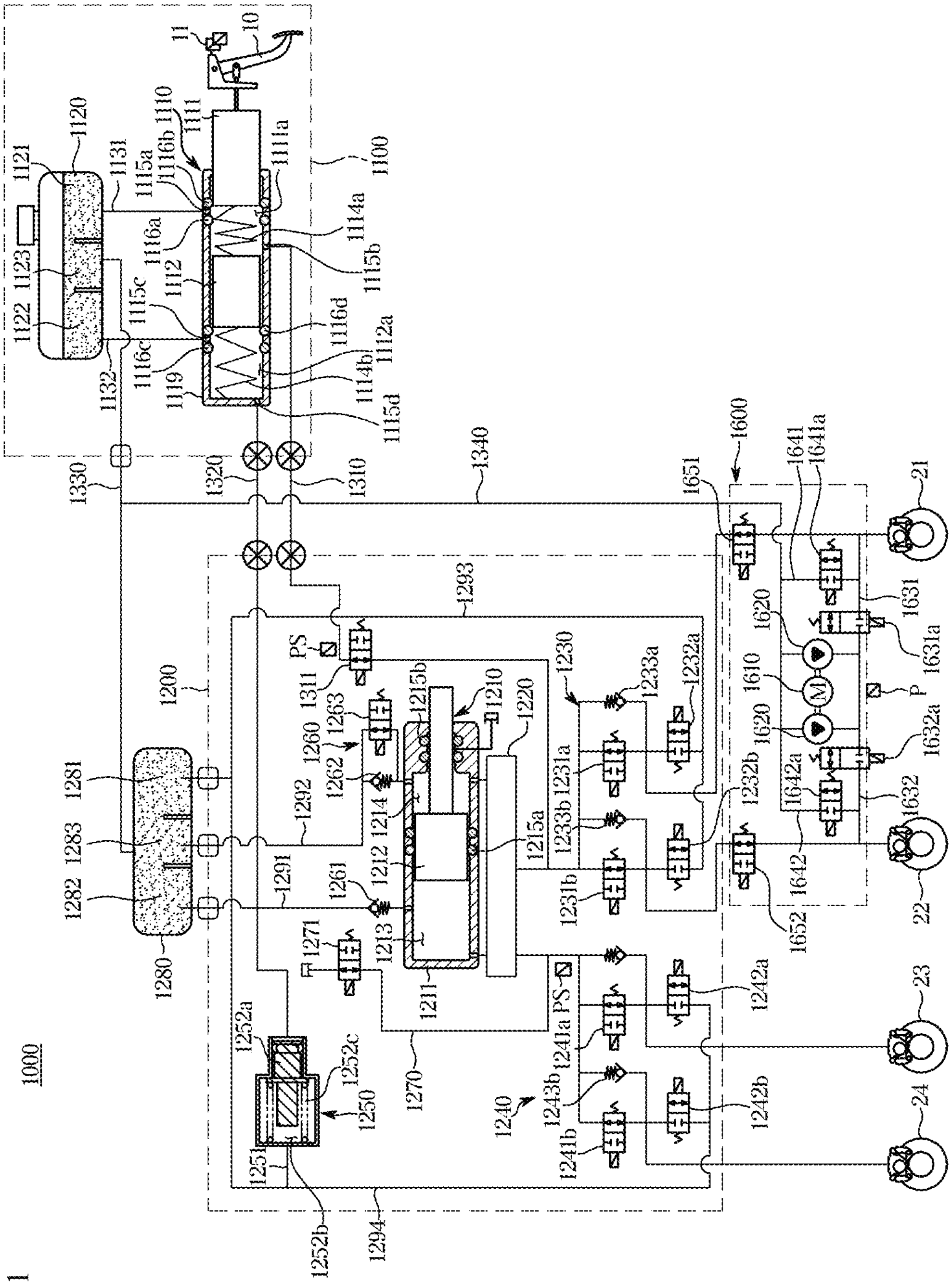
FIG. 1 is a hydraulic circuit diagram illustrating an electric brake system according to the present embodiment.

Hereinafter, exemplary embodiments of the present invention will be described in detail with reference to the accompanying drawings. The following embodiments are provided to completely convey the spirit of the present invention to those skilled in the art to which the present invention pertains. The present invention is not limited to the embodiments shown herein and may be embodied in other forms. In the drawings, parts that bear no relation to descriptions may be omitted in order to clarify the present invention, and elements may be exaggerated in sizes thereof for ease of understanding.

FIG. 1 is a hydraulic circuit diagram illustrating an electric brake system 1000 according to the present embodiment.

Referring to FIG. 1, the electric brake system 1000 according to the present embodiment may be provided to include a first block 1100 in which a mechanical part that is mechanically operated is disposed, a second block 1200 in which an electronic part that is electronically operated and controlled is disposed, an emergency module that operates when the electronic part is inoperative and provides hydraulic pressure in an auxiliary manner, and a connecting line 1300 that hydraulically connects the first block 1100, the second block 1200, and the emergency module to each other.

In the first block 1100, the mechanical part that mechanically operates in connection or conjunction with a brake pedal 10 is disposed, and in the second block 1200, the electronic part that is electronically operated and controlled, such as a valve and a sensor whose operations are controlled by an electronic control unit (not illustrated), is disposed. The first block 1100 and the second block 1200 may be disposed to be spaced apart from each other in a vehicle, but hydraulically connected by a plurality of connecting lines 1300, thereby improving vehicle mountability of the electric brake system 1000, and furthermore, allowing efficient spatial arrangement by promoting the degree of freedom in vehicle design. In addition, the emergency module may be disposed together on the second block 1200 or disposed in the vehicle in a state of being spaced apart from the second block 1200.

The mechanical part may include component elements that perform mechanical operations in conjunction with the brake pedal 10 regardless of a control signal of the electronic control unit and may be disposed in the first block 1100.

The mechanical part may include a main reservoir 1120 in which a pressurized medium such as brake oil is stored, a master cylinder 1110 that pressurizes and discharges the pressurized medium accommodated therein according to a pressing force of the brake pedal 10, and main reservoir flow paths 1131 and 1132 connecting the main reservoir 1120 and the master cylinder 1110.

The master cylinder 1110 may be configured to include at least one hydraulic chamber, and thus pressurize and discharge the pressurized medium therein. The master cylinder 1110 may include a first master chamber **1111*a*, a second master chamber 1112*a*, and a first master piston 1111 and a second master piston 1112 provided in the master chambers 1111*a* and 1112*a***, respectively.

The first master chamber **1111*a* may be formed on an inlet side (a right side of FIG. 1) of a cylinder block 1119 to which the brake pedal 10 is connected, and in the first master chamber 1111*a*, the first master piston 1111** may be accommodated to be reciprocally movable.

The pressurized medium may be introduced into and discharged from the first master chamber **1111*a* through a first hydraulic port 1115*a* and a second hydraulic port 1115*b*. The first hydraulic port 1115*a* may be connected to a first main reservoir flow path 1131 to be described below so that the pressurized medium is introduced into the first master chamber 1111*a* from the main reservoir 1120, and a first sealing member 1116*a* and a second sealing member 1116*b* may be provided at the front (a left side of FIG. 1) and the rear (the right side of FIG. 1) of the first hydraulic port 1115*a*, respectively, to seal the first master chamber 1111*a*. The second hydraulic port 1115*b* may be connected to a first connecting line 1310 to be described below so that the pressurized medium in the first master chamber 1111*a* is discharged to the first connecting line 1310 or, conversely, the pressurized medium is introduced into the first master chamber 1111*a* from the first connecting line 1310**.

The first master piston 1111 may be provided to be accommodated in the first master chamber **1111*a*, and may pressurize the pressurized medium accommodated in the first master chamber 1111*a* by moving forward and may generate a negative pressure in the first master chamber 1111*a* by moving backward. Specifically, as a volume of the first master chamber 1111*a* is decreased when the first master piston 1111 moves forward, the pressurized medium present in the first master chamber 1111*a* may be pressurized, and thus hydraulic pressure may be generated. Conversely, as the volume of the first master chamber 1111*a* is increased when the first master piston 1111 moves backward, the pressurized medium present in the first master chamber 1111*a* may be depressurized, and at the same time, the negative pressure may be generated in the first master chamber 1111*a***.

The second master chamber **1112*a* may be formed on the front side (the left side of FIG. 1) of the first master chamber 1111*a* on the cylinder block 1119, and in the second master chamber 1112*a*, the second master piston 1112** may be accommodated to be reciprocally movable.

The pressurized medium may be introduced into and discharged from the second master chamber **1112*a* through a third hydraulic port 1115*c* and a fourth hydraulic port 1115*d*. The third hydraulic port 1115*c* may be connected to a second main reservoir flow path 1132 to be described below so that the pressurized medium is introduced into the second master chamber 1112*a* from the main reservoir 1120, and a third sealing member 1116*c* and a fourth sealing member 1116*d* may be provided at the front (the left side of FIG. 1) and the rear (the right side of FIG. 1) of the third hydraulic port 1115*c*, respectively, to seal the second master chamber 1112*a*. The fourth hydraulic port 1115*d* may be connected to a second connecting line 1320 to be described below so that the pressurized medium in the second master chamber 1112***a* is discharged to the second connecting line 1320 or, conversely, the pressurized medium is introduced into the second master chamber 1112*a* from the second connecting line 1320.

The second master piston 1112 may be provided to be accommodated in the second master chamber 1112*a*, may pressurize the pressurized medium accommodated in the second master chamber 1112*a* by moving forward, and may generate a negative pressure in the second master chamber 1112*a* by moving backward. Specifically, as a volume of the second master chamber 1112*a* is decreased when the second master piston 1112 moves forward, the pressurized medium present in the second master chamber 1112*a* may be pressurized, and thus hydraulic pressure may be generated. Conversely, as the volume of the second master chamber 1112*a* is increased when the second master piston 1112 moves backward, the pressurized medium present in the second master chamber 1112*a* may be depressurized, and at the same time, the negative pressure may be generated in the second master chamber 1112*a*.

A first piston spring 1114*a* and a second piston spring 1114*b* are provided to elastically support the first master piston 1111 and the second master piston 1112, respectively. To this end, the first piston spring 1114*a* may be disposed between a front surface (a left end of FIG. 1) of the first master piston 1111 and a rear surface (a right end of FIG. 1) of the second master piston 1112, and the second piston spring 1114*b* may be disposed between a front surface (the left end of FIG. 1) of the second master piston 1112 and an inner surface of the cylinder block 1119. When displacements occur in the first master piston 1111 and the second master piston 1112 according to an operation such as braking, the first piston spring 1114*a* and the second piston spring 1114*b* may be compressed, respectively, and then, when the operation such as braking is released, the first master piston 1111 and the second master piston 1112 may return to their original positions while the first piston spring 1114*a* and the second piston spring 1114*b* expand by elastic force, respectively.

The main reservoir flow path is provided to hydraulically connect the main reservoir 1120 and the master cylinder 1110. The main reservoir flow path may include the first main reservoir flow path 1131 connecting the first master chamber 1111*a* and the main reservoir 1120 and the second main reservoir flow path 1132 connecting the second master chamber 1112*a* and the main reservoir 1120.

The main reservoir 1120 may accommodate and store the pressurized medium therein, but may be provided to be partitioned into a plurality of chambers. The main reservoir 1120 may include a first main chamber 1121 formed on one side thereof by the partitioning and connected to the first main reservoir flow path 1131, a second main chamber 1122 formed on the other side of the main reservoir 1120 by the partitioning and connected to the second main reservoir flow path 1132, and a third main chamber 1123 formed at a central portion of the main reservoir 1120 by the partitioning and communicating with a sub reservoir 1280 by being connected to a third connecting line 1330 to be described below. In this way, the main reservoir 1120 may be partitioned by partition walls, and each of the chambers 1121, 1122, and 1123 may be provided to communicate with each other, thereby stably transmitting and providing the pressurized medium through the first main reservoir flow path 1131, the second main reservoir flow path 1132, and the third connecting line 1330. Furthermore, interiors of the first master chamber 1111*a* and the second master chamber 1112*a* may always maintain a state of being filled with the pressurized medium, so that friction between the master pistons 1111 and 1112 and the cylinder block 1119 is minimized, and thus durability of the master cylinder 1110 may be improved and introduction of foreign substances from the outside may be blocked.

The electronic part may include component elements that are electronically operated and controlled by a control signal from the electronic control unit (ECU, not illustrated), and may be disposed in the second block 1200.

The electronic part may include the electronic control unit, the sub reservoir 1280 for storing the pressurized medium therein for auxiliary purposes, a hydraulic pressure supply device 1210 for generating hydraulic pressure by operating a hydraulic piston 1212 by an electrical signal output corresponding to a displacement of the brake pedal 10, a hydraulic pressure control unit 1220 including a plurality of valves to transmit the hydraulic pressure of the pressurized medium provided from the hydraulic pressure supply device 1210 to the wheel cylinders 20 and adjust the hydraulic pressure, a simulation device 1250 providing a reaction force to a driver's pressing force to the brake pedal 10, a dump controller 1260 provided between the hydraulic pressure supply device 1210 and the sub reservoir 1280 to control the flow of the pressurized medium, and a plurality of sub reservoir flow paths 1291, 1292, 1293, and 1294 connecting the sub reservoir 1280 and the hydraulic pressure supply device 1210 or connecting the sub reservoir 1280 and a first hydraulic circuit 1230 and a second hydraulic circuit 1240 of the hydraulic pressure control unit 1220.

The sub reservoir 1280 may be disposed in the second block 1200 and store the pressurized medium for auxiliary purposes. As the pressurized medium is stored in the electronic part by the sub reservoir 1280 for auxiliary purposes, the pressurized medium may be smoothly supplied and transmitted through the hydraulic pressure supply device 1210, the dump controller 1260, the first and second hydraulic circuits 1230 and 1240, and the like, in the electronic part.

The sub reservoir 1280 may be connected to the main reservoir 1120 of the mechanical part by a third connecting line 1330 to be described below and connected to the pressure chambers 1213 and 1214 of the hydraulic pressure supply device 1210 by a first sub reservoir flow path 1291 and a second sub reservoir flow path 1292 to be described below. In addition, the sub reservoir 1280 may be connected to the first hydraulic circuit 1230 and the second hydraulic circuit 1240 by a third sub reservoir flow path 1293 and a fourth sub reservoir flow path 1294 to be described below, respectively. A more detailed description thereof will be given below.

The hydraulic pressure supply device 1210 is provided to implement a reciprocating movement of the hydraulic piston 1212 by receiving a driver's willingness to brake as an electrical signal from a pedal displacement sensor 11 for detecting the displacement of the brake pedal 10, and to generate hydraulic pressure of the pressurized medium through the movement.

The hydraulic pressure supply device 1210 may include a hydraulic pressure providing unit that provides a pressure of the pressurized medium transmitted to the wheel cylinders 20 and a power provider (not illustrated) that generates power of the hydraulic piston 1212 based on an electrical signal of the pedal displacement sensor 11 or an electrical signal transmitted from the electronic control unit.

The hydraulic pressure providing unit includes a cylinder block 1211 provided to allow the pressurized medium to be accommodated therein, the hydraulic piston 1212 accommodated in the cylinder block 1211, pressure chambers 1213 and 1214 formed by partitioning by the hydraulic piston 1212, and a sealing member 1215 provided between the hydraulic piston 1212 and the cylinder block 1211 to seal the pressure chambers 1213 and 1214.

The pressure chambers 1213 and 1214 may include the first pressure chamber 1213 positioned at the front of the hydraulic piston 1212 (a left side of the hydraulic piston 1212 in FIG. 1) and the second pressure chamber 1214 positioned at the rear of the hydraulic piston 1212 (a right side of the hydraulic piston 1212 in FIG. 1). That is, the first pressure chamber 1213 is provided to be partitioned by the cylinder block 1211 and a front surface of the hydraulic piston 1212 so that a volume thereof is varied according to movement of the hydraulic piston 1212, and the second pressure chamber 1214 is provided to be partitioned by the cylinder block 1211 and a rear surface of the hydraulic piston 1212 so that a volume thereof is varied according to the movement of the hydraulic piston 1212.

The first pressure chamber 1213 may be hydraulically connected to the hydraulic pressure control unit 1220 to be described below by the hydraulic flow path, and the second pressure chamber 1214 may also be hydraulically connected to the hydraulic pressure control unit 1220 by the hydraulic flow path. In addition, the first pressure chamber 1213 may be connected to the sub reservoir 1280 by the first sub reservoir flow path 1291, and the second pressure chamber 1214 may be connected to the sub reservoir 1280 by the second sub reservoir flow path 1292.

The sealing member 1215 includes a piston sealing member 1215*a* provided between the hydraulic piston 1212 and the cylinder block 1211 to seal between the first pressure chamber 1213 and the second pressure chamber 1214 and a driving shaft sealing member 1215*b* provided between the power provider and the cylinder block 1211 to seal an opening of the second pressure chamber 1214 and the cylinder block 1211. A hydraulic pressure or negative pressure of the first pressure chamber 1213 and the second pressure chamber 1214 generated by forward or backward movement of the hydraulic piston 1212 may be sealed by the piston sealing member 1215*a* and the driving shaft sealing member 1215*b* and transmitted to the hydraulic flow path without leakage.

The power provider may generate and provide power to the hydraulic piston 1212 by an electrical signal. For example, the power provider may include a motor for generating a rotational force and a power converter for converting the rotational force of the motor into a translational movement of the hydraulic piston 1212, but the power provider is not limited to the structure and device.

The hydraulic pressure control unit 1220 is provided between the hydraulic pressure supply device 1210 and the wheel cylinder 20 and provided so that the operation thereof is controlled by the electronic control unit to adjust the hydraulic pressure transmitted to the wheel cylinders 20.

The hydraulic pressure control unit 1220 may be equipped with the first hydraulic circuit 1230 for controlling the flow of the hydraulic pressure transmitted to first and second wheel cylinders 21 and 22 among the four wheel cylinders 20 and the second hydraulic circuit 1230 for controlling the flow of the hydraulic pressure transmitted to third and fourth wheel cylinders 23 and 24, and includes a plurality of hydraulic flow paths and solenoid valves to control the hydraulic pressure transmitted to the wheel cylinders 20.

The first and second hydraulic circuits 1230 and 1240 may include first to fourth inlet valves 1231*a*, 1231*b*, 1241*a*, and 1241*b* to control the flow of the pressurized medium flowing toward the first to fourth wheel cylinders 20, respectively. The first to fourth inlet valves 1231*a*, 1231*b*, 1241*a*, and 1241*b* may be disposed upstream of the first to fourth wheel cylinders 21, 22, 23, and 24, respectively, and provided as normal-open-type solenoid valves that are open in normal times and operate to close upon receiving an electrical signal from the electronic control unit.

The first and second hydraulic circuits 1230 and 1240 may include first to fourth check valves 1233*a*, 1233*b*, 1243*a*, and 1243*b* provided to be connected in parallel to the first to fourth inlet valves 1231*a*, 1231*b*, 1241*a*, and 1241*b*. The check valves 1233*a*, 1233*b*, 1243*a*, and 1243*b* may be provided on the bypass flow path connecting the front and rear sides of the first to fourth inlet valves 1231*a*, 1231*b*, 1241*a*, and 1241*b* on the first and second hydraulic circuits 1230 and 1240, and allow only a flow of the pressurized medium from the respective wheel cylinders 20 toward the hydraulic pressure control unit 1220 and block a flow of the pressurized medium toward the wheel cylinders 20. The hydraulic pressure of the pressurized medium applied to the respective wheel cylinders 20 may be quickly removed by the first to fourth check valves 1233*a*, 1233*b*, 1243*a*, and 1243*b*, and even when the first to fourth inlet valves 1231*a*, 1231*b*, 1241*a*, and 1241*b* do not operate normally, the hydraulic pressure of the pressurized medium applied to the wheel cylinders 20 may be smoothly returned toward the hydraulic pressure supply device 1210.

The first hydraulic circuit 1230 may include a first outlet valve 1232*a* and a second outlet valve 1232*b* for adjusting the flow of the pressurized medium discharged to the third sub reservoir flow path 1293 to be described below to improve performance when braking of the first and second wheel cylinders 21 and 22 is released. The first and second outlet valves 1232*a* and 1232*b* may control decompression of the first and second wheel cylinders 21 and 22 by detecting the braking pressure of the first and second wheel cylinders 21 and 22 and being selectively opened when decompression braking is required, such as in an ABS dump mode. The first and second outlet valves 1232*a* and 1232*b* may be provided as normal-closed-type solenoid valves that are closed in normal times and operate to open upon receiving an electrical signal from the electronic control unit.

The second hydraulic circuit 1240 may include a third outlet valve 1242*a* and a fourth outlet valve 1242*b* for adjusting the flow of the pressurized medium discharged to the fourth sub reservoir flow path 1294 to be described below to improve performance when braking of the third and fourth wheel cylinders 23 and 24 is released. The third and fourth outlet valves 1242*a* and 1242*b* may control decompression of the third and fourth wheel cylinders 23 and 24 by detecting the braking pressure of the third and fourth wheel cylinders 23 and 24 and being selectively opened when decompression braking is required, such as in the ABS dump mode. Like the first and second outlet valves 1232*a* and 1232*b*, the third and fourth outlet valves 1242*a* and 1242*b* may be provided as normal-closed-type solenoid valves that are closed in normal times and operate to open upon receiving an electrical signal from the electronic control unit.

The simulation device 1250 is provided to provide a reaction force to a driver's pressing force for operating the brake pedal 10.

The simulation device 1250 is provided on the second connecting line 1320 to be described below and joins a fourth sub reservoir flow path 1294 to be described below by a simulation flow path 1251, and the simulation device 1250 provides the reaction force in response to the driver's pressing force applied to the brake pedal 10, thereby providing a pedal feeling to the driver, and thus a detailed operation of the brake pedal 10 may be promoted, and accordingly, the braking force of the vehicle may be adjusted in detail.

The simulation device 1250 may include a pedal simulator 1252 whose front end is provided in the second connecting line 1320 and the simulation flow path 1251 connected to a rear end of the pedal simulator 1252 and joining the fourth sub reservoir flow path 1294 to be described below.

The pedal simulator 1252 includes a simulation piston 1252*a* provided to be displaceable by the pressurized medium introduced from the second connecting line 1320, a simulation chamber 1252*b* whose volume is varied by the displacement of the simulation piston 1252*a* and that communicates with the simulation flow path 1251 positioned behind, and a simulation spring 1252*c* that elastically supports the simulation piston 1252*a*.

The simulation piston 1252*a* is provided to be displaceable in the simulation chamber 1252*b* by the pressurized medium introduced through the second connecting line 1320. Specifically, the hydraulic pressure of the pressurized medium introduced through the second connecting line 132 may be transmitted to a front surface (a right surface of FIG. 1) of the simulation piston 1252*a*, so that a displacement occurs in the simulation piston 1252*a*, and as the volume of the simulation chamber 1252*b* formed on a rear surface (a left surface of FIG. 1) of the simulation piston 1252*a* is decreased due to the displacement of the simulation piston 1252*a*, the pressurized medium accommodated in the simulation chamber 1252*b* may be supplied to the sub reservoir 1280 through the simulation flow path 1251 and the fourth sub reservoir flow path 1294. Since the simulation spring 1252*c* elastically supports the simulation piston 1252*a*, the simulation spring 1252*c* is compressed according to a displacement of the simulation piston 1252*a* and an elastic restoring force corresponding thereto is transmitted to the driver, so that the driver may receive a pedal feeling.

Meanwhile, in the drawing, the simulation spring 1252*c* is illustrated as being provided as a coil spring as an example, but in addition, various structures may be provided as long as the simulation piston 1252*a* is provided as an elastic force and an elastic restoring force at the same time. For example, the simulation piston 1252*a* may be made of a material such as rubber or made of various members capable of storing an elastic force such as a leaf spring.

The simulation flow path 1251 may be connected to the rear end of the pedal simulator 1252 so that one end thereof communicates with the simulation chamber 1252*b* and the other end thereof joins the fourth sub reservoir flow path 1294 to be described below. By connecting the simulation chamber 1252*b* and the sub reservoir 1280 through the simulation flow path 1251, the pressurized medium discharged from the simulation chamber 1252*b* may be supplied to the sub reservoir 1280, or conversely, the pressurized medium may be supplied from the sub reservoir 1280 to the simulation chamber 1252*b*.

Describing the operation of the simulation device 1250, when the driver applies the pressing force by operating the brake pedal 10, the first master piston 1111 and the second master piston 1112 move forward and thus the pressurized medium in the second master chamber 1112*a* is supplied and pressurized to a front surface of the simulation piston 1252*a* through the second connecting line 1320, and accordingly, a displacement occurs in the simulation piston 1252*a* and the simulation spring 1252*c* is compressed, thereby providing a pedal feeling to the driver by the elastic restoring force. The pressurized medium filled in the simulation chamber 1252*b* is transmitted to the sub reservoir 1280 through the simulation flow path 1251 and the fourth sub reservoir flow path 1294. Then, when the driver releases the pressing force of the brake pedal 10, the simulation spring 1252*c* expands by the elastic force and the simulation piston 1252*a* returns to its original position, and the pressurized medium that presses the front surface of the simulation piston 1252*a* is returned to the second master chamber 1112*a* through the second connecting line 1320. In this case, the pressurized medium is supplied to the simulation chamber 1252*b* from the sub reservoir 1280 by sequentially passing through the fourth sub reservoir flow path 1294 and the simulation flow path 1251, so that the interior of the simulation chamber 1252*b* may be filled with the pressurized medium again.

As such, since the interior of the simulation chamber 1252*b* is always filled with the pressurized medium, the friction of the simulation piston 1252*a* may be minimized during operation of the pedal simulator 1252, and thus durability of the pedal simulator 1252 may be improved and introduction of foreign substances from the outside may be blocked.

The dump controller 1260 is provided between the sub reservoir 1280 and the hydraulic pressure supply device 1210 to control the flow of the pressurized medium.

The dump controller 1260 may include a first dump valve 1261 provided on the first sub reservoir flow path 1291 to control the flow of the pressurized medium, a second dump valve 1262 provided on the second sub reservoir flow path 1292 to control the flow of the pressurized medium, and a third dump valve 1263 provided in parallel to the second dump valve 1262 on the second sub reservoir flow path 1292.

The first dump valve 1261 may be provided on the first sub reservoir flow path 1291 connecting the sub reservoir 1280 and the first pressure chamber 1213, and provided as a check valve for allowing only a flow of the pressurized medium from the sub reservoir 1280 toward the first pressure chamber 1213 and blocking the flow of the pressurized medium in a direction opposite thereto. In addition, the second dump valve 1262 may be provided on the second sub reservoir flow path 1292 connecting the sub reservoir 1280 and the second pressure chamber 1214, and provided as a check valve for allowing only the flow of the pressurized medium from the sub reservoir 1280 toward the second pressure chamber 1214 and blocking the flow of the pressurized medium in a direction opposite thereto.

The third dump valve 1263 may be provided on a bypass flow path connecting front and rear sides of the second dump valve 1262 on the second sub reservoir flow path 1292. The third dump valve 1263 may be provided as a solenoid valve for controlling the flow of the pressurized medium in both directions between the sub reservoir 1280 and the second pressure chamber 1214. The third dump valve 1263 may be provided as a normal-open-type solenoid valve that is open in normal times and operates to close upon receiving a closing signal from the electronic control unit.

The backup flow path 1270 may be provided to connect any one of the main reservoir 1120 and the sub reservoir 1280 and a front end of the second hydraulic circuit 1240. Specifically, the backup flow path 1270 may have one end connected to any one of the reservoirs 1120 and 1280 or the flow paths connected to the reservoirs 1120 and 1280, and the other end connected to an upstream side of the third and fourth inlet valves 1241*a* and 1241*b*.

A first cut valve 1311 and a second cut valve 1271 for controlling the flow of the pressurized medium in both directions may be respectively provided in the first connecting line 1310 and the backup flow path 1270 to be described below. The first cut valve 1311 and the second cut valve 1271 may be provided as normal-open-type solenoid valves that are open in normal times and operate to close upon receiving a closing signal from the electronic control unit.

In this way, when the first cut valve 1311 is closed, the pressurized medium of the master cylinder 1110 may be prevented from being directly transmitted to the wheel cylinder 20 and the hydraulic pressure provided from the hydraulic pressure supply device 1210 may be prevented from leaking toward the master cylinder 1110, and when the first cut valve 1311 is opened, the pressurized medium pressurized by the master cylinder 1110 may be directly supplied to the first hydraulic circuit 1230 through the first connecting line 1310, and thus braking may be implemented.

In addition, when the second cut valve 1271 is closed, the hydraulic pressure supplied from the hydraulic pressure supply device 1210 toward the second hydraulic circuit 1240 may be prevented from leaking toward the reservoirs 1120 and 1280, and when braking is released, the second cut valve 1271 is opened, and the hydraulic pressure of the second hydraulic circuit 1240 applied to the third and fourth wheel cylinders 23 and 24 may be discharged to the reservoirs 1120 and 1280 through the backup flow path 1270.

The sub reservoir flow path is provided to hydraulically connect the first hydraulic circuit 1230, the second hydraulic circuit 1240, and the hydraulic pressure supply device 1210 to the sub reservoir 1280. The sub reservoir flow path may include the first sub reservoir flow path 1291 connecting the sub reservoir 1280 and the first pressure chamber 1213 of the hydraulic pressure supply device 1210, the second sub reservoir flow path 1292 connecting the sub reservoir 1280 and the second pressure chamber 1214 of the hydraulic pressure supply device 1210, the third sub reservoir flow path 1293 connecting the sub reservoir 1280 and a rear end of the first hydraulic circuit 1230, and a fourth sub reservoir flow path 1294 connecting the sub reservoir 1280 and a rear end of the second hydraulic circuit 1240.

The first sub reservoir flow path 1291 may have one end connected to the sub reservoir 1280 and the other end connected to the first pressure chamber 1213 of the hydraulic pressure supply device 1210, and the first dump valve 1261 of the dump controller 1260 described above may be provided. In addition, the second sub reservoir flow path 1292 may have one end connected to the sub reservoir 1280 and the other end connected to the second pressure chamber 1214 of the hydraulic pressure supply device 1210, and the flow of the pressurized medium may be controlled by the second dump valve 1262 and the third dump valve 1263.

The third sub reservoir flow path 1293 may have one end connected to the sub reservoir 1280 and the other end connected to a downstream side of the first and second outlet valves 1232*a* and 1232*b* of the first hydraulic circuit 1230. In addition, the fourth sub reservoir flow path 1294 may have one end connected to the sub reservoir 1280, and the other end connected to a downstream side of the third and fourth outlet valves 1242*a* and 1234*b* of the second hydraulic circuit 1240, and the simulation flow path 1251 may join a middle portion of the fourth sub reservoir flow path 1294.

The sub reservoir 1280 may accommodate and store the pressurized medium therein, but may be provided to be partitioned into a plurality of chambers. The sub reservoir 1280 may include a first sub chamber 1281 formed on one side thereof by the partitioning and connected to the third and fourth sub reservoir flow paths 1293 and 1294, a second sub chamber 1282 formed on the other side of the sub reservoir 1280 by the partitioning and connected to the first sub reservoir flow path 1291, and a third sub chamber 1283 formed at a central portion of the sub reservoir 1280 by the partitioning and connected to the second sub reservoir flow path 1293. In this way, the sub reservoir 1280 may be partitioned by partition walls, and each of the chambers 1281, 1282, and 1283 may be provided to communicate with each other, thereby stably transmitting and providing the pressurized medium through the first to fourth sub reservoir flow paths 1291, 1292, 1293, and 1294.

The electronic part further includes a plurality of pressure sensors PS disposed in various flow paths to detect the hydraulic pressure of the pressurized medium. In FIG. 1, the pressure sensors PS are illustrated as being respectively disposed on the second hydraulic circuit 1240 and the first connecting line 1310 to be described below, but are not limited to the positions, and may be disposed at various positions as long as the pressure sensors PS are disposed in the electronic part to be able to detect the hydraulic pressure of the pressurized medium discharged from the master cylinder 1110 and the hydraulic pressure of the pressurized medium discharged from the hydraulic pressure supply device 1210.

Meanwhile, when a malfunction such as a failure of the hydraulic pressure supply device 1210 or inability to control the hydraulic pressure control unit 1220 occurs, hydraulic pressure may not be transmitted to the wheel cylinder 20, and thus there is a problem that braking of the vehicle is not possible. Accordingly, the electric brake system 1000 according to the present embodiment is provided with an emergency module that operates and intervenes when the electronic part is inoperative due to a failure of the hydraulic pressure supply device 1210 or the like and provides hydraulic pressure of the pressurized medium in an auxiliary manner.

The emergency module may include a hydraulic pressure auxiliary device 1600 that operates and intervenes when the hydraulic pressure supply device 1210 is inoperative, and be disposed together on the second block 1200 where the electronic part is disposed, mounted or installed on the vehicle in a state of being spaced apart from the second block 1200.

The hydraulic pressure auxiliary device 1600 may be provided between the first hydraulic circuit 1230 and the first and second wheel cylinders 21 and 21, and may operate and intervene when the hydraulic pressure supply device 12100 is inoperative due to a failure or the like, and generate and provide hydraulic pressure required for braking of the first and second wheel cylinders 21 and 22. A mode in which the hydraulic pressure auxiliary device 1600 operates due to a malfunction of the hydraulic pressure supply device 1210 is referred to as a first fallback mode.

The hydraulic pressure auxiliary device 1600 includes a first isolation valve 1651 for controlling a flow of the pressurized medium transmitted from at least one of the master cylinder 1110 or the hydraulic pressure supply device 1210 to the first wheel cylinder 21, a second isolation valve 1652 for controlling a flow of the pressurized medium transmitted from at least one of the master cylinder 1100 and the hydraulic pressure supply device 1210 to the second wheel cylinder 22, a pair of pumps 1620 for pressurizing the pressurized medium, a motor 1610 for driving the pair of pumps 1620, a first auxiliary hydraulic flow path 1631 for transmitting the pressurized medium pressurized by the pumps 1620 to the first wheel cylinder 21, a second auxiliary hydraulic flow path 1632 for transmitting the pressurized medium pressurized by the pumps 1620 to the wheel cylinder 22, a first support valve 1631*a* provided on the first auxiliary hydraulic flow path 1631 to control the flow of the pressurized medium, a second support valve 1632*a* provided on the second auxiliary hydraulic flow path 1632 to control the flow of the pressurized medium, a first auxiliary dump flow path 1641 for discharging the pressurized medium applied to the first wheel cylinder 21, a second auxiliary dump flow path 1642 for discharging the pressurized medium applied to the second wheel cylinder 22, a first discharge valve 1641*a* provided on the first auxiliary dump flow path 1641 to control the flow of the pressurized medium, and a second discharge valve 1642*a* provided on the second auxiliary dump flow path 1642 to control the flow of the pressurized medium.

The first and second isolation valves 1651 and 1652 are provided to allow or block a hydraulic connection between at least any one of the master cylinder 1100 or the hydraulic pressure supply device 1210 and the first and second wheel cylinders 21 and 22.

When the hydraulic pressure of the pressurized medium generated by the pumps 1620 leaks toward the hydraulic pressure control unit 1220 or the hydraulic pressure supply device 1210 during operation of the hydraulic pressure auxiliary device 1600, there is a risk of a safety accident because a load is applied to the device or rapid braking of the wheel cylinder is not implemented. Accordingly, the first and second isolation valves 1651 and 1652 may allow the hydraulic connection between the master cylinder 1110 and the hydraulic pressure supply device 1210 and the wheel cylinders 21 and 22 in a normal operating mode and a second fallback mode, and block the hydraulic connection between the master cylinder 1110 and the hydraulic pressure supply device 1210 and the wheel cylinders 21 and 22 in the first fallback mode where the hydraulic pressure auxiliary device 1600 operates.

The first isolation valve 1651 is provided between the first wheel cylinder 21 and a downstream side of the first inlet valve 1231*a* to allow or block the flow of the pressurized medium. The first isolation valve 1651 may be provided as a normal-open-type solenoid valve that is open in normal times and operates to open upon receiving an electrical signal from the electronic control unit.

The second isolation valve 1652 is provided between the second wheel cylinder 22 and a downstream side of the second inlet valve 1231*b* to allow or block the flow of the pressurized medium. The second isolation valve 1652 may be provided as a normal-open-type solenoid valve that is open in normal times and operates to open upon receiving an electrical signal from the electronic control unit.

When the electronic control unit determines a malfunction due to a failure of the electronic part such as the hydraulic pressure supply device 1210, the electronic control unit switches the electric brake system to the first fallback mode to close the first and second isolation valves 1651 and 1652 and operates the motor 1610. The motor 1610 may receive a driver's willingness to brake as an electrical signal from the pedal displacement sensor 11 for detecting the displacement of the brake pedal 10, or operate based on an electrical signal transmitted by the electronic control unit. The motor 1610 may operate a pair of pumps 1620 by receiving electric power from a battery or the like.

The pair of pumps 1620 may pressurize the pressurized medium according to the reciprocating movement of a piston (not illustrated) provided in the motor 1610. The pumps 1620 receive the pressurized medium from the reservoirs 1120 and 1280 through a fourth connecting line 1340 to be described below, and pressurize the pressurized medium to correspond to a hydraulic pressure level required for braking through the operation of the motor 1610.

The pressurized medium of which the hydraulic pressure is generated by any one of the pair of pumps 1620 may be transmitted to the first wheel cylinder 21 by the first auxiliary hydraulic flow path 1631 provided as a discharge-side flow path of the pumps 1620. To this end, the first auxiliary hydraulic flow path 1631 may have an inlet-side end connected to a discharge side of the pumps 1620 and an outlet-side end connected to the first wheel cylinder 21, and the first support valve 1631*a* is provided on the first auxiliary hydraulic flow path 1631 to control a flow of the pressurized medium transmitted from the pumps 1620 to the first wheel cylinder 21. The first support valve 1631*a* may be provided as a normal-closed-type solenoid valve that is closed in normal times and operates to open upon receiving an electrical signal from the electronic control unit. When the electric brake system is switched to the first fallback mode, the electronic control unit may open the first support valve 1631*a* so that the hydraulic pressure of the pressurized medium discharged from the pumps 1620 is provided to the first wheel cylinder 21.

The pressurized medium of which the hydraulic pressure is generated by the other one of the pair of pumps 1620 may be transmitted to the second wheel cylinder 22 by the second auxiliary hydraulic flow path 1632 provided as the discharge-side flow path of the pumps 1620. To this end, the second auxiliary hydraulic flow path 1632 may have an inlet-side end connected to the discharge side of the pumps 1620 and an outlet-side end connected to the second wheel cylinder 22, and the second support valve 1632*a* is provided on the second auxiliary hydraulic flow path 1632 to control a flow of the pressurized medium transmitted from the pumps 1620 to the second wheel cylinder 22. Like the first support valve 1631*a*, the second support valve 1632*a* may be provided as a normal-closed-type solenoid valve that is closed in normal times and operates to open upon receiving an electrical signal from the electronic control unit. When the electric brake system is switched to the first fallback mode, the electronic control unit may open the second support valve 1632*a* so that the hydraulic pressure of the pressurized medium discharged from the pumps 1620 is provided to the second wheel cylinder 22.

The pressurized medium applied to the first wheel cylinder 21 in the first fallback mode may be discharged through the first auxiliary dump flow path 1641. To this end, the first auxiliary dump flow path 1641 may have one end connected to a first wheel cylinder 21 side or the first auxiliary hydraulic flow path 1631 downstream of the first support valve 1631*a* and the other end connected to the fourth connecting line 1340 or connected to an inlet side of the pumps 1620. The first discharge valve 1641*a* for controlling a flow of the pressurized medium discharged from the first wheel cylinder 21 is provided on the first auxiliary dump flow path 1641. The first discharge valve 1641*a* may be provided as a normal-closed-type solenoid valve that is closed in normal times and operates to open upon receiving an electrical signal from the electronic control unit.

The pressurized medium applied to the second wheel cylinder 22 may be discharged through the second auxiliary dump flow path 1642. To this end, the second auxiliary dump flow path 1642 may have one end connected to the second wheel cylinder 22 side or the second auxiliary hydraulic flow path 1632 downstream of the second support valve 1632*a* and connected to the fourth connecting line 1340 or connected to the inlet side of the pumps 1620. The second discharge valve 1642*a* for controlling a flow of the pressurized medium discharged from the second wheel cylinder 22 is provided on the second auxiliary dump flow path 1642. Like the first discharge valve 1641*a*, the second discharge valve 1642*a* may be provided as a normal-closed-type solenoid valve that is closed in normal times and operates to open upon receiving an electrical signal from the electronic control unit.

The emergency module further includes a plurality of pressure sensors PS for detecting the hydraulic pressure of the pressurized medium provided by the hydraulic pressure auxiliary device 1600. In FIG. 1, the pressure sensors PS are illustrated as being disposed between the first auxiliary hydraulic flow path 1631 and the second auxiliary hydraulic flow path 1632, but is not limited to the positions, and may be provided at various positions as long as the pressure sensors PS are able to detect the hydraulic pressure of the pressurized medium provided from the hydraulic pressure auxiliary device 1600 to the wheel cylinders 21 and 22.

The connecting line 1300 is provided to hydraulically connect the first block 1100 of the mechanical part, the second block 1200 of the electronic part, and the emergency module, which are spaced apart from each other.

The connecting line 1300 may include the first connecting line 1310 connecting the first master chamber 1111*a* of the master cylinder 1110 to the first hydraulic circuit 1230, the second connecting line 1320 connecting the second master chamber 1112*a* of the master cylinder 1110 to the pedal simulator 1252, the third connecting line 1330 connecting the main reservoir 1120 and the sub reservoir 1280 to each other, and the fourth connecting line 1340 connecting the hydraulic pressure auxiliary device 1600 to the third connecting line 1330.

The first connecting line 1310 may have one end communicating with the first master chamber 1111*a* of the master cylinder 1110 and the other end connected to a front end side of the first hydraulic circuit 1230. The first cut valve 1311 described above may be provided in the first connecting line 1310 to control the flow of the pressurized medium between the first master chamber 1111*a* and the first and second wheel cylinders 21 and 22.

The second connecting line 1320 may have one end communicating with the second master chamber 1112*a* and the other end connected to a front end of the pedal simulator 1252. Therefore, the hydraulic pressure of the pressurized medium discharged from the second master chamber 1112*a* may be transmitted to the pedal simulator 1252 through the second connecting line 1320, and since a separate valve for controlling the flow of the pressurized medium is not interposed in the second connecting line 1320, the simulation device 1250 operates in any of the normal operating mode, the first fallback mode, and the second fallback mode, thereby providing a pedaling feel to the driver.

The third connecting line 1330 may be provided to have one end communicating with the main reservoir 1120 and the other end communicating with the sub reservoir 1280. The third connecting line 1330 may promote smooth supply of the pressurized medium to each component element by allowing the pressurized medium to be transmitted between the reservoirs when the pressurized medium is excessively large or small in a reservoir on one side.

The fourth connecting line 1340 may have one end connected to the third connecting line 1330 and the other end connected to an inlet side of the pumps 1620 of the hydraulic pressure auxiliary device 1600 or to the auxiliary dump flow paths 1641 and 1642. As the fourth connecting line 1340 is connected to the third connecting line 1330 through which the two reservoirs 1120 and 1280 communicate, the pressurized medium may be supplied to the pumps 1620 of the hydraulic pressure auxiliary device 1600, or the pressurized medium discharged through the auxiliary dump flow paths 1641 and 1642 may be recovered to the reservoirs 1120 and 1280.

The first connecting line 1310 and the second connecting line 1320 may be provided as pipes having a predetermined strength, and the third connecting line 1330 and the fourth connecting line 1340 may be provided as hoses having elasticity. Since the pressurized medium of which the hydraulic pressure is generated is transmitted from the first master chamber 1111*a* and the second master chamber 1112*a* to the first connecting line 1310 and the second connecting line 1320, respectively, product durability and performance may be promoted by providing the first connecting line 1310 and the second connecting line 1320 as pipes having a strength capable of withstanding hydraulic pressure. Meanwhile, since the third connecting line 1330 and the fourth connecting line 1340 are provided to be connected to the main reservoir 1120 and the sub reservoir 1280 having an atmospheric pressure level and thus the pressurized medium of which no hydraulic pressure is generated is transmitted to the third connecting line 1330 and the fourth connecting line 1340, the third connecting line 1330 and the fourth connecting line 1340 may be provided as a material having elasticity to promote ease of installation corresponding to an arrangement position of the first block 1100, the second block 1200, and the emergency module. The first connecting line 1310 and the second connecting line 1320 may be installed on a vehicle body by a fastening member (not illustrated) having a predetermined restoring force to maintain connectivity despite an impact such as a vehicle accident.

Hereinafter, operation of the electric brake system 1000 according to the present embodiment will be described.

The electric brake system 1000 according to the present embodiment may perform the normal operating mode in which various devices and valves operate normally without failure or abnormality, the first fallback mode in which the electronic part including the hydraulic pressure supply device 1210 corresponds to an inoperative state and thus the hydraulic pressure auxiliary device 1600 operates and intervenes, and the second fallback mode in which both the hydraulic pressure supply device 1210 and the hydraulic pressure auxiliary device 1600 correspond to the inoperative state and thus the hydraulic pressure of the master cylinder 1110 is directly supplied to the wheel cylinder 20.

Figure 2:
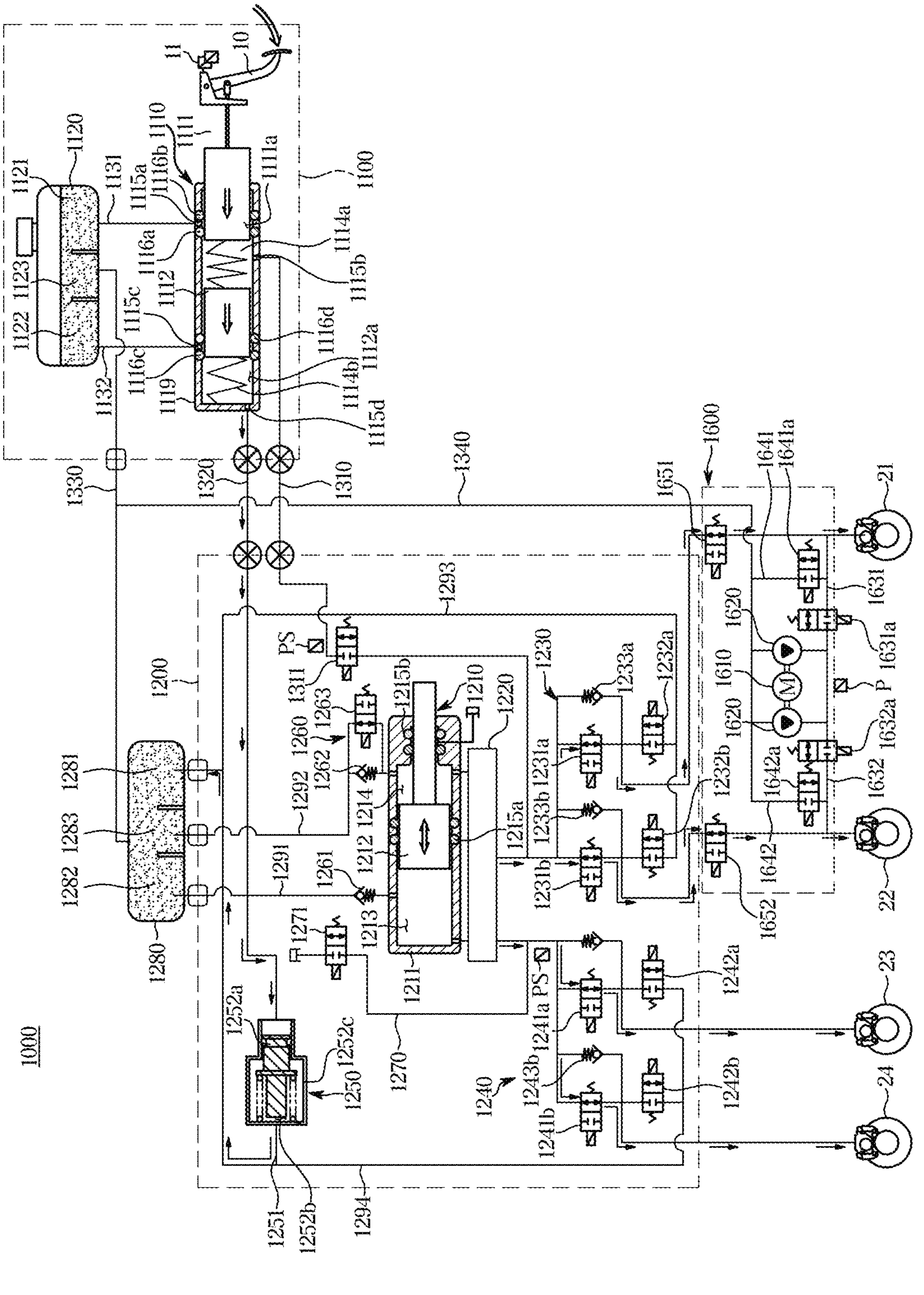
FIG. 2 is a hydraulic circuit diagram illustrating a state in which the electric brake system according to the present embodiment performs a normal operating mode.

FIG. 2 is a hydraulic circuit diagram illustrating a state in which the electric brake system 1000 according to the present embodiment performs the normal operating mode. Referring to FIG. 2, in the normal operating mode of the electric brake system 1000 according to the present embodiment, when the driver presses the brake pedal 10 to brake the vehicle, the pedal displacement sensor 11 detects the displacement of the brake pedal 10 or the amount of pressing force, and the hydraulic pressure supply device 1210 generates a corresponding hydraulic pressure of the pressurized medium based on the detected displacement and the amount of pressing force. Alternatively, when the electronic control unit determines that braking is required in an autonomous driving situation of the vehicle, the electronic control unit transmits an electrical signal to the hydraulic pressure supply device 1210 so that hydraulic pressure of the pressurized medium required for braking is generated. Specifically, the hydraulic pressure of the pressurized medium is generated in the first pressure chamber 1213 or the second pressure chamber 1214 by the forward or backward movement of the hydraulic piston 1212, and the hydraulic pressure of the pressurized medium is adjusted and controlled through the hydraulic pressure control unit 1220 and then provided to the first to fourth wheel cylinders 21, 22, 23, and 24 to implement braking of the vehicle.

In this case, the first cut valve 1311 and the second cut valve 1321 are switched to the closed state, and thus the hydraulic pressure provided from the hydraulic pressure supply device 1210 may be prevented from leaking toward the master cylinder 1110 or the reservoirs 1120 and 1280, and at the same time, the pressurized medium may be prevented from being transmitted from the master cylinder 1110 to the first and second hydraulic circuits 1230 and 1240. In addition, the first to fourth inlet valves 1231*a*, 1231*b*, 1241*a*, and 1241*b* are maintained in the open state, and the first to fourth outlet valves 1232*a*, 1232*b*, 1242*a*, and 1242*b* are maintained in the closed state.

Meanwhile, when the driver operates the brake pedal 10, the first master piston 1111 moves forward and a displacement occurs, but as the first cut valve 1311 is switched to the closed state, the first master chamber 1111*a* is sealed and the pressurized medium in the first master chamber 1111*a* is not discharged, and a displacement occurs by moving the second master piston 1112 forward. By the forward movement of the second master piston 1112, the pressurized medium in the second master chamber 1112*a* is pressurized, and the pressurized medium in the second master chamber 1112*a* is transmitted toward the simulation device 1250 along the second connecting line 1320. The pressurized medium supplied to the simulation device 1250 may move the simulation piston 1252*a* of the pedal simulator 1252 forward to compress the simulation spring 1252*c*, and the elastic restoring force generated by the compression of the simulation spring 1252*c* may be provided to the driver as a pedal feeling. The pressurized medium accommodated in the simulation chamber 1252*b* of the pedal simulator 1252 is discharged to the sub reservoir 1280 by sequentially passing through the simulation flow path 1251 and the fourth sub reservoir flow path 1294.

In normal operating mode, since the hydraulic pressure supply device 1210 and the electronic part are in the normal operating state, the hydraulic pressure auxiliary device 1600 does not operate, and thus by maintaining the first and second isolation valves 1651 and 1652 in the open state, hydraulic pressure of the pressurized medium supplied from the hydraulic pressure supply device 1210 may be smoothly provided to the wheel cylinders 21 and 22.

Hereinafter, an operation of releasing the normal operating mode of the electric brake system 1000 according to the present embodiment will be described.

Figure 3:
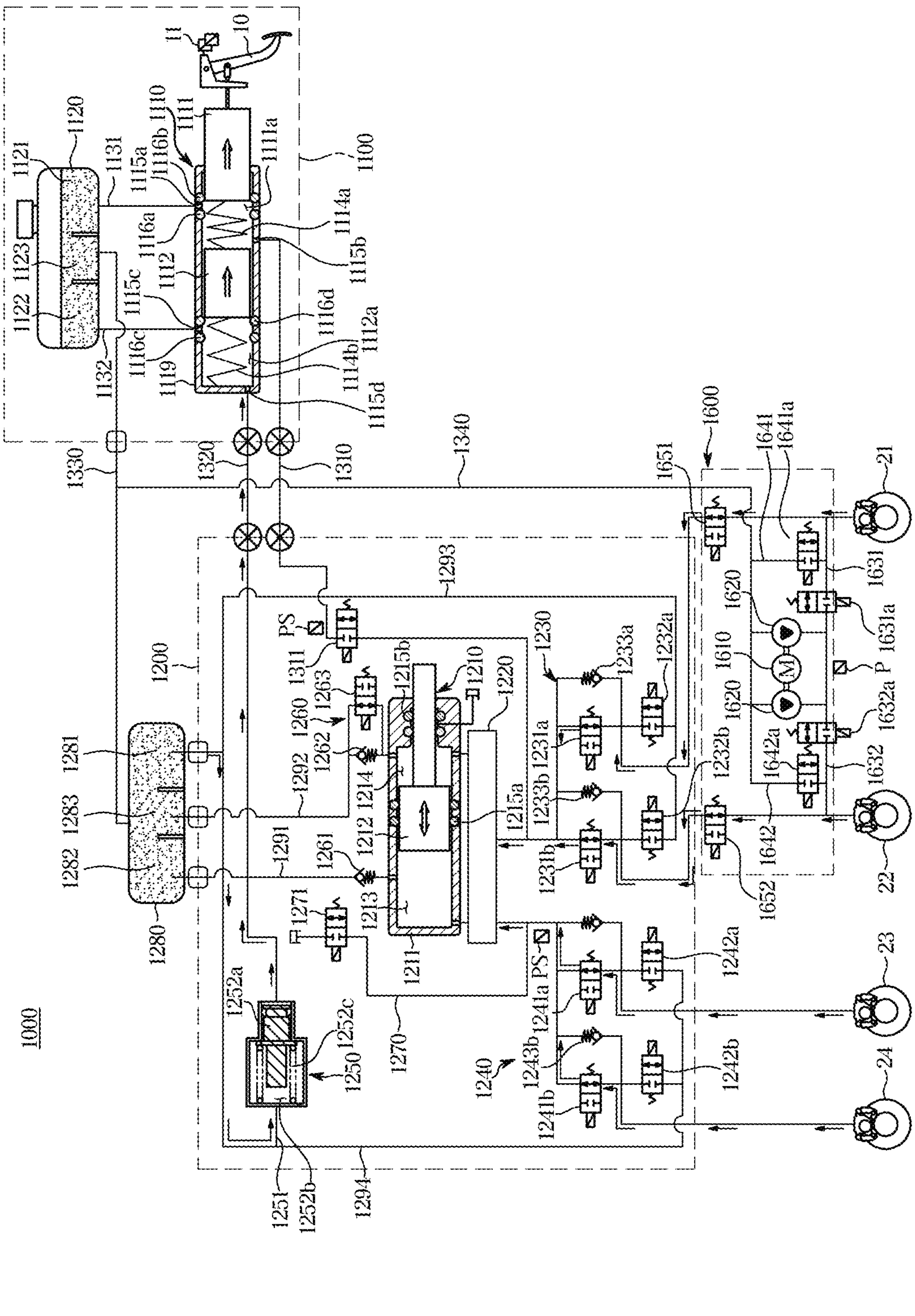
FIG. 3 is a hydraulic circuit diagram illustrating a state in which the electric brake system according to the present embodiment releases the normal operating mode.

FIG. 3 is a hydraulic circuit diagram illustrating a state in which the electric brake system according to the present embodiment releases the normal operating mode, and referring to FIG. 3, when the pressing force applied to the brake pedal 10 is released or the electronic control unit determines that brake release is required in the autonomous driving situation of the vehicle, an electrical signal is transmitted to the hydraulic pressure supply device 1210 so that generating the hydraulic pressure of the pressurized medium is stopped and a negative pressure is generated at the same time, and thus the hydraulic pressure of the pressurized medium applied to the wheel cylinders 20 is recovered. Specifically, the negative pressure may be generated in the first pressure chamber 1213 or the second pressure chamber 1214 by the forward or backward movement of the hydraulic piston 1212, and the pressurized medium applied to the first to fourth wheel cylinders 21, 22, 23, and 24 may be returned to the first pressure chamber 1213 or the second pressure chamber 1214 through the hydraulic pressure control unit 1220 by the negative pressure.

In this case, the first cut valve 1311 and the second cut valve 1321 are still maintained in the closed state, and thus the pressurized medium recovered to the hydraulic pressure supply device 1210 may be prevented from leaking toward the master cylinder 1110 or the reservoirs 1120 and 1280, and the first to fourth inlet valves 1231*a*, 1231*b*, 1241*a*, and 1241*b* may maintain the open state, and the first to fourth outlet valves 1232*a*, 1232*b*, 1242*a*, and 1242*b* may maintain the closed state. However, when it is required to quickly remove the hydraulic pressure of the pressurized medium applied to the wheel cylinders as needed, such as in the ABS or TCS mode, some of the first to fourth outlet valves 1232*a*, 1232*b*, 1242*a*, and 1242*b* may be selectively opened so that the pressurized medium applied to the wheel cylinders is discharged toward the sub reservoir 1280.

As the driver releases the pressing force of the brake pedal 10, the first master piston 1111 and the second master piston 1112, which have moved forward, may return to their original positions by the elastic restoring force of the first piston spring 1114*a* and the second piston spring 1114*b*, and the simulation piston 1252*a* of the pedal simulator 1252 may also return to its original position by the elastic restoring force of the simulation spring 1252*c*. In this case, the pressurized medium applied to the front surface of the simulation piston 1252*a* may be recovered to the second master chamber 1112*a* along the second connecting line 1320, and the simulation chamber 1252*b* may be refilled with the pressurized medium sequentially passing through the fourth sub reservoir flow path 1294 and the simulation flow path 1251.

The electric brake system 1000 according to the present embodiment may be switched to the first fallback mode in the case of an inoperative state such as a failure of the electronic part including the hydraulic pressure supply device 1210, a leakage of the pressurized medium, or the like.

Figure 4:
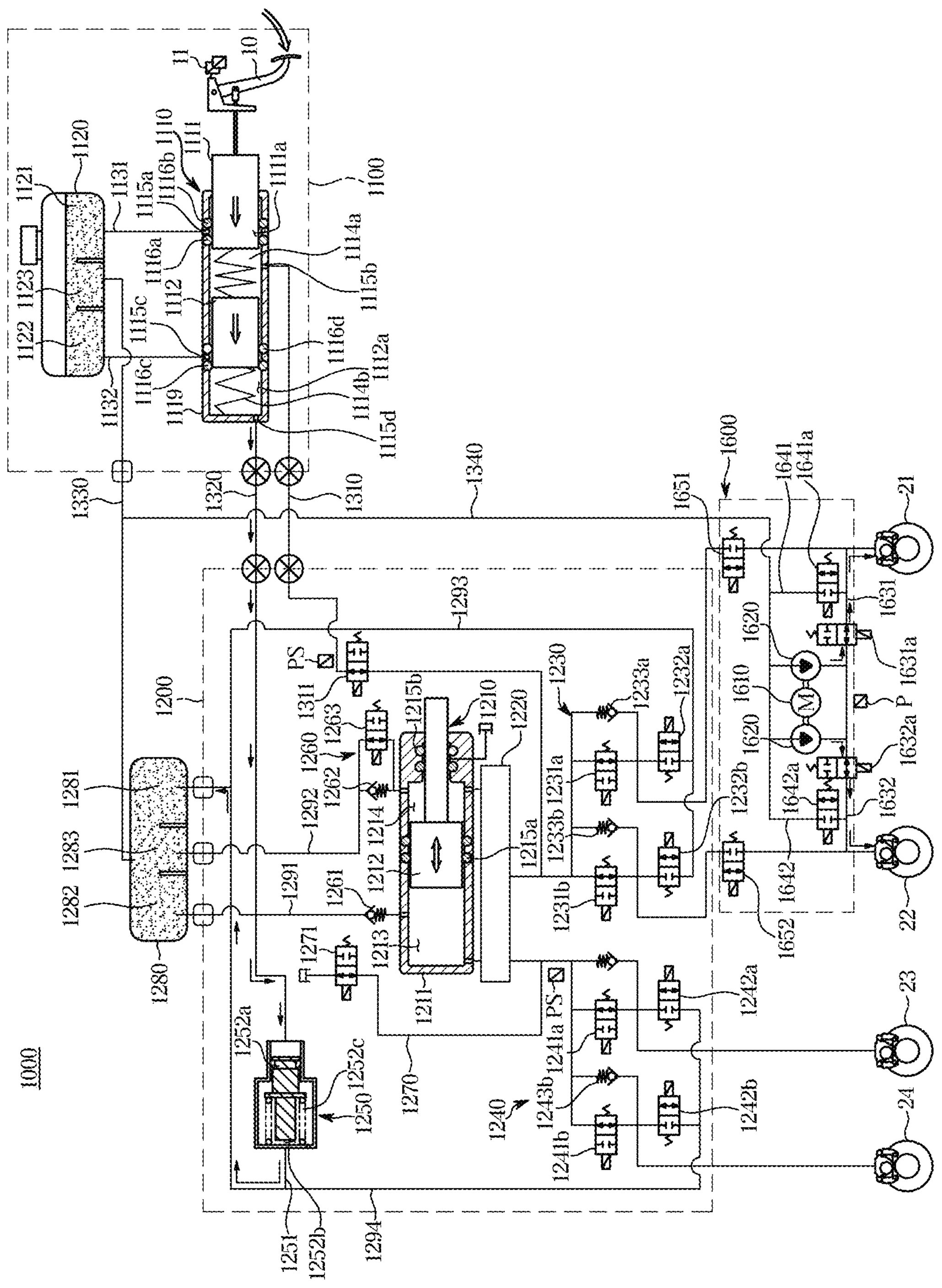
FIG. 4 is a hydraulic circuit diagram illustrating a state in which a first fallback mode is performed when a hydraulic pressure supply device of the electric brake system according to the present embodiment is stopped.

FIG. 4 is a hydraulic circuit diagram illustrating a state in which the electric brake system 1000 according to the present embodiment performs the first fullback mode. Referring to FIG. 4, when the driver applies a pressing force to the brake pedal 10 in the first fallback mode or when the electronic control unit determines that braking is required in an autonomous driving situation, the hydraulic pressure auxiliary device 1600 disposed in the emergency module is operated. By operating the first and second isolation valves 1651 and 1652 to be in the closed state, the electronic control unit hydraulically disconnect the first and second wheel cylinders 21 and 22 from the hydraulic pressure supply device 1210. Then, the electronic control unit may operate the motor 1610 based on the displacement information about the pedal or a required braking force determined in the autonomous driving situation, and the pair of pumps 1620 may generate the hydraulic pressure of the pressurized medium by the operation of the motor 1610. The pressurized medium of which the hydraulic pressure is generated by the pumps 1620 may be transmitted to the first and second wheel cylinders 21 and 22 through the first and second auxiliary hydraulic flow paths 1631 and 1632, respectively. In this case, the first and second support valves 1631*a* and 1632*a* respectively provided on the first and second auxiliary hydraulic flow paths 1631 and 1632 are switched to the open state, and the first and second discharge valves 1641*a* and 1642*a* disposed on the first and second auxiliary dump flow paths 1641 and 1642 maintain the closed state to prevent a leakage of the pressurized medium of which hydraulic pressure is generated by the pumps 1620. Meanwhile, when the braking forces of the first wheel cylinder 21 and the second wheel cylinder 22 are required to be set differently according to the operating situation of the vehicle, the electronic control unit may differently control the opening timing or degree of opening of the first support valve 1631*a* and the second support valve 1632*a*.

When the driver operates the brake pedal 10, the first master piston 1111 moves forward and a displacement occurs, but the first master chamber 1111*a* is sealed by the closed state of the first and second isolation valves 1651 and 1652, the pressurized medium in the first master chamber 1111*a* is not discharged, and a displacement occurs by moving the second master piston 1112 forward. By the forward movement of the second master piston 1112, the pressurized medium in the second master chamber 1112*a* is pressurized, and the pressurized medium in the second master chamber 1112*a* is transmitted toward the simulation device 1250 along the second connecting line 1320. The pressurized medium supplied to the simulation device 1250 may move the simulation piston 1252*a* of the pedal simulator 1252 forward to compress the simulation spring 1252*c*, and the elastic restoring force generated by the compression of the simulation spring 1252*c* may be provided to the driver as a pedal feeling. The pressurized medium accommodated in the simulation chamber 1252*b* of the pedal simulator 1252 is discharged to the sub reservoir 1280 by sequentially passing through the simulation flow path 1251 and the fourth sub reservoir flow path 1294.

Hereinafter, an operation of releasing the first fallback mode by the electric brake system 1000 according to the present embodiment will be described.

Figure 5:
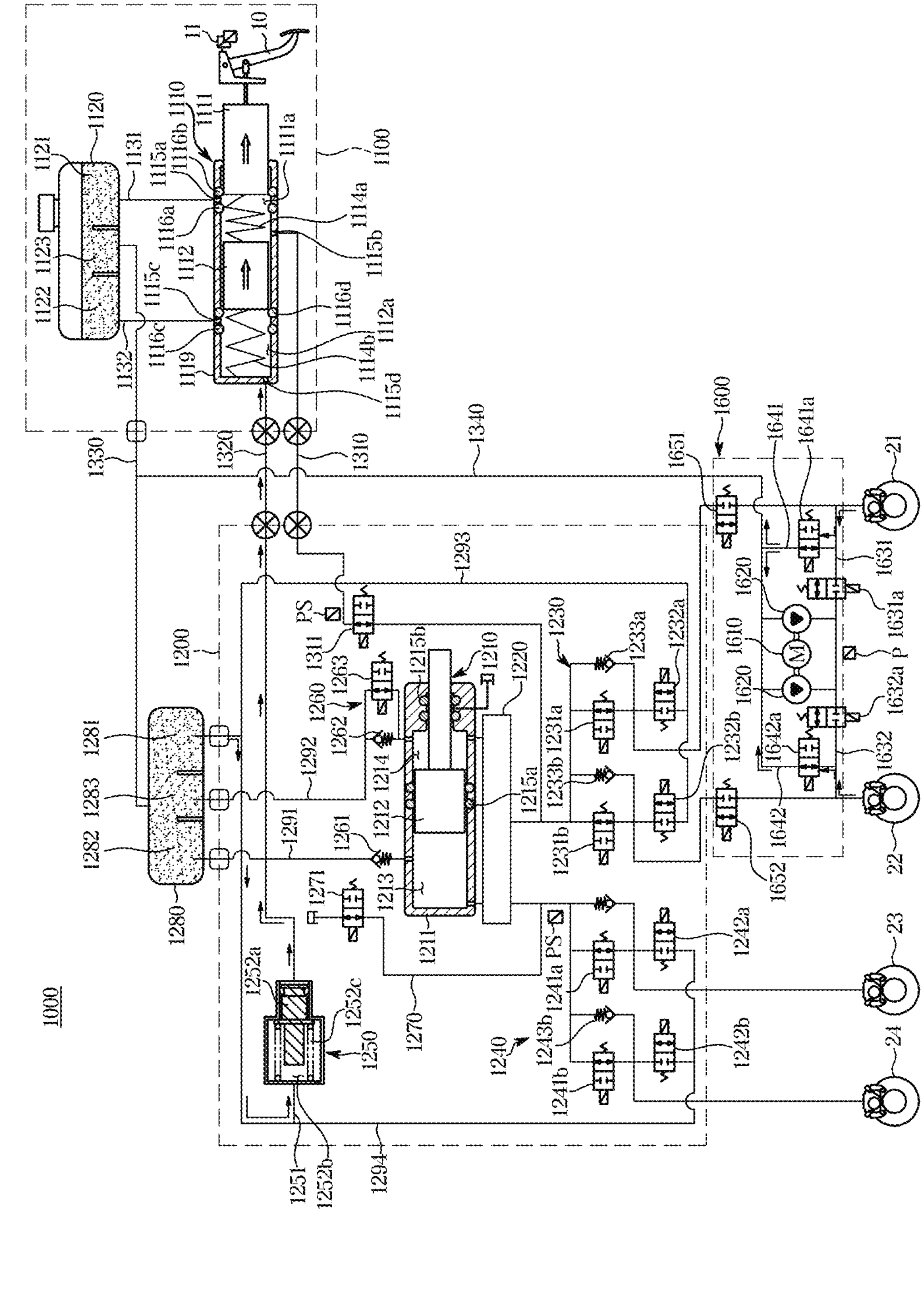
FIG. 5 is a hydraulic circuit diagram illustrating a state in which the electric brake system according to the present embodiment releases the first fallback mode.

FIG. 5 is a hydraulic circuit diagram illustrating a state in which the electric brake system according to the present embodiment releases the first fallback mode, and referring to FIG. 5, when the pressing force applied to the brake pedal 10 is released or the electronic control unit determines that brake release is required in the autonomous driving situation of the vehicle, an electrical signal is transmitted to the hydraulic pressure auxiliary device 1600 so that the operation of the motor 1610 and the pumps 1620 is stopped. At the same time, the first and second discharge valves 1641*a* and 1642*a* disposed in the first and second auxiliary dump flow paths 1641 and 1642 are switched to the open state, and the hydraulic pressure of the pressurized medium applied to the first and second wheel cylinders 21 and 22 may be discharged to the reservoirs 1120 and 1280 by sequentially passing through the first and second auxiliary dump flow paths 1641 and 1642 and the fourth connecting line 1340, or recovered to the inlet side of the pumps 1620 through the first and second auxiliary dump flow paths 1641 and 1642. In this case, the first and second isolation valves 1651 and 1652 maintain the closed state, and the first and second support valves 1631*a* and 1632*a* provided in the first and second auxiliary hydraulic flow paths 1631 and 1632, respectively, are switched to the closed state. Meanwhile, when brake release amount of the first wheel cylinder 21 and the second wheel cylinder 22 are required to be set differently according to the operating situation of the vehicle, the electronic control unit may differently control the opening timing or degree of opening of the first discharge valve 1641*a* and the second discharge valve 1642*a*.

As the driver releases the pressing force of the brake pedal 10, the first master piston 1111 and the second master piston 1112, which have moved forward, may return to their original positions by the elastic restoring force of the first piston spring 1114*a* and the second piston spring 1114*b*, and the simulation piston 1252*a* of the pedal simulator 1252 may also return to its original position by the elastic restoring force of the simulation spring 1252*c*. In this case, the pressurized medium applied to the front surface of the simulation piston 1252*a* may be recovered to the second master chamber 1112*a* along the second connecting line 1320, and the simulation chamber 1252*b* may be refilled with the pressurized medium sequentially passing through the fourth sub reservoir flow path 1294 and the simulation flow path 1251.

The electric brake system 1000 according to the present embodiment may be switched to the second fallback mode in the case where both the hydraulic pressure supply device 1210 and the hydraulic pressure auxiliary device 1600 are in an inoperative state, such as a failure, a leakage of the pressurized medium, or the like.

Figure 6:
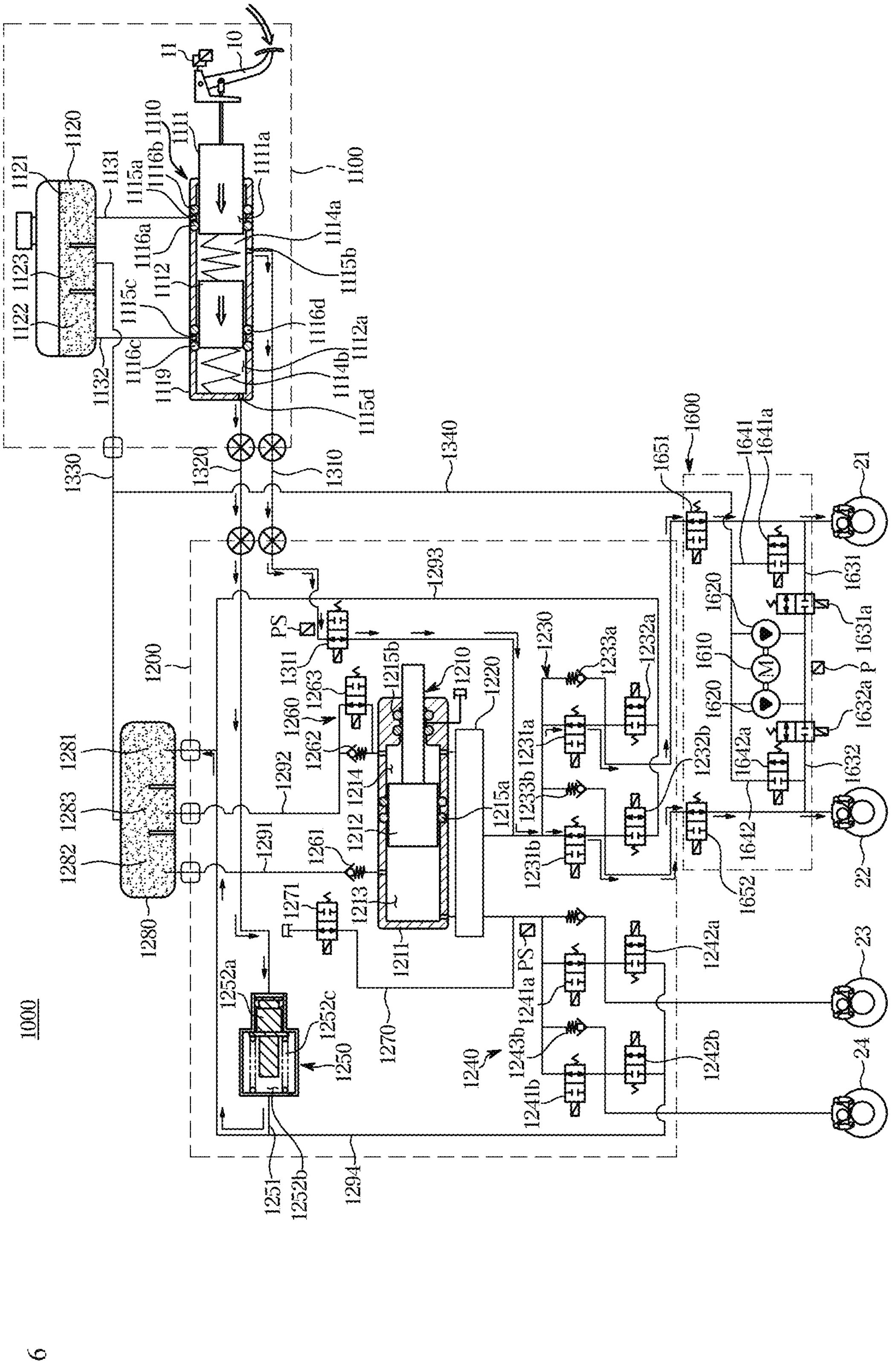
FIG. 6 is a hydraulic circuit diagram illustrating a state in which a second fallback mode is performed when the hydraulic pressure supply device and a hydraulic pressure auxiliary device of the electric brake system according to the present embodiment are stopped.

FIG. 6 is a hydraulic circuit diagram illustrating a state in which the electric brake system 1000 according to the present embodiment performs the second fullback mode. Referring to FIG. 6, in the second fallback mode, valves of the electronic part and the emergency module maintain the non-operating state. In this case, when the driver applies a pressing force to the brake pedal 10, the first master piston 1111 moves forward, and accordingly, the pressurized medium accommodated in the first master chamber 1111*a* is transmitted toward the first hydraulic circuit 1230 through the first connecting line 1310. At this time, since the first and second isolation valves 1651 and 1652 of the hydraulic pressure auxiliary device 1600 maintain the open state, the hydraulic pressure of the pressurized medium transmitted through the first connecting line 1310 is transmitted to the first and second wheel cylinders 21 and 22, thereby implementing braking.

At the same time, the pressurized medium accommodated in the first master chamber 1111*a* moves the second master piston 1112 forward, so that a displacement occurs. By the forward movement of the second master piston 1112, the pressurized medium in the second master chamber 1112*a* is transmitted toward the simulation device 1250 along the second connecting line 1320. The pressurized medium supplied to the simulation device 1250 may move the simulation piston 1252*a* of the pedal simulator 1252 forward to compress the simulation spring 1252*c*, and the elastic restoring force generated by the compression of the simulation spring 1252*c* may be provided to the driver as a pedal feeling. That is, the simulation device 1250 according to the present embodiment may operate in both the first fallback mode and the second fallback mode, as well as the normal operating mode, and thus may provide a pedaling feeling to the driver in any operating situation. The pressurized medium accommodated in the simulation chamber 1252*b* of the pedal simulator 1252 is discharged to the sub reservoir 1280 by sequentially passing through the simulation flow path 1251 and the fourth sub reservoir flow path 1294.

Hereinafter, an operation of releasing the second fallback mode by the electric brake system 1000 according to the present embodiment will be described.

Figure 7:
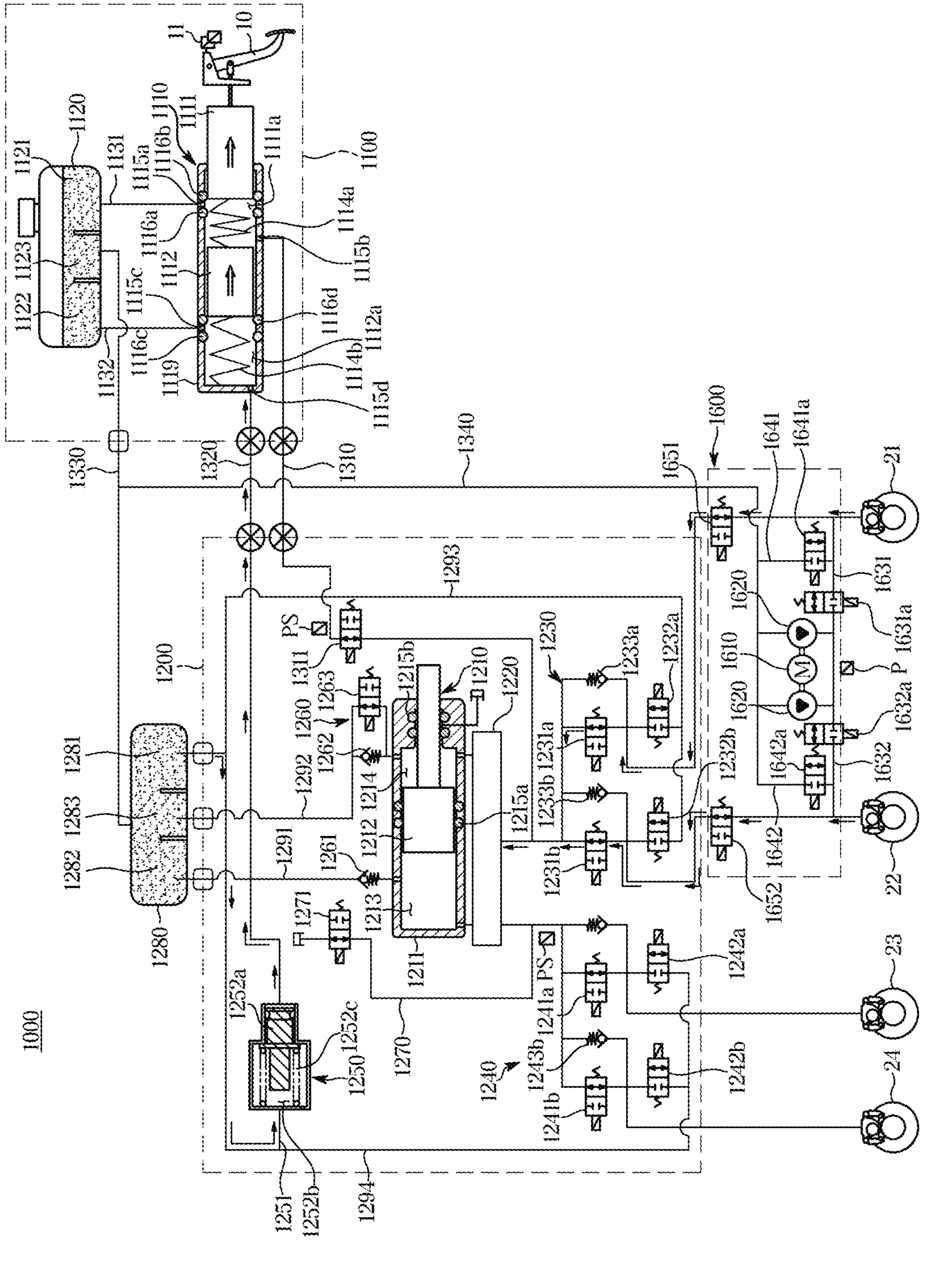
FIG. 7 is a hydraulic circuit diagram illustrating a state in which the electric brake system according to the present embodiment releases the second fallback mode.

FIG. 7 is a hydraulic circuit diagram illustrating a state in which the electric brake system according to the present embodiment releases the second fallback mode, and referring to FIG. 7, as the driver releases the pressing force applied to the brake pedal 10, the first master piston 1111 and the second master piston 1112 which have moved forward returns to their original positions by the elastic restoring forces of the first piston spring 1114*a* and the second piston spring 1114*b*. As the first master piston 1111 returns to its original position, a negative pressure may be generated in the first master chamber 1111*a*, and the pressurized medium applied to the first and second wheel cylinders 21 and 22 may be recovered to the first master chamber 1111*a* along the first connecting line 1310 by the negative pressure.

At the same time, the second master piston and the simulation piston 1252*a* of the pedal simulator 1252 also return to their original positions by the respective elastic restoring forces of the second piston spring 1114*b* and the simulation spring 1252*c*. In this case, the pressurized medium applied to the front surface of the simulation piston 1252*a* may be recovered to the second master chamber 1112*a* along the second connecting line 1320, and the simulation chamber 1252*b* may be refilled with the pressurized medium sequentially passing through the fourth sub reservoir flow path 1294 and the simulation flow path 1251.

As such, since in the electric brake system 1000 according to the present embodiment, the first block 1100 in which the mechanical part, which is mechanically operated, is disposed and the second block 1200 in which the electronic part, which is electronically operated and controlled, is disposed, are mounted on the vehicle in a physically spaced state, and at the same time, the emergency module that operates when the electronic part is inoperative is provided, mountability and space utilization of the vehicle can be increased, and stable and effective braking can be implemented in response to various operating situations of the vehicle. In addition, since the same electric brake system 1000 may be applied regardless of whether a left-hand drive (LHD)/right-hand drive (RHD) vehicle is used, vehicle development can be facilitated and product productivity can be improved.

In addition, since the first block 1100 of the mechanical part in conjunction with the brake pedal 10 can be installed close to a passenger seat of the vehicle and the second block 1200 of the electronic part that generates and adjusts the hydraulic pressure while electronically being operated and controlled and the emergency module can be mounted on a position spaced apart from the passenger seat of the vehicle, noise generated in the process of generating and adjusting the hydraulic pressure of the pressurized medium can be restrained from entering into the passenger seat, and costs required for maintenance in case of a failure of any one of the first block 1100, the second block 1200, and the emergency module can also be reduced, and thus product competitiveness can be promoted.

The invention claimed is:

1. An electric brake system comprising:

a first block in which a mechanical part mechanically operated in conjunction with a brake pedal is disposed;

a second block in which an electronic part electronically operated and controlled by an electronic control unit is disposed, wherein the second block is spaced apart from the first block;

an emergency module operating when the electronic part is inoperative and providing hydraulic pressure to a wheel cylinder in an auxiliary manner; and a connecting line hydraulically connecting the first block, the second block, and the emergency module to each other, wherein the mechanical part includes a master cylinder equipped with a main reservoir in which a pressurized medium is stored, a master piston connected to the brake pedal, and a master chamber whose volume is varied by a displacement of the master piston, the electronic part includes a hydraulic pressure supply device generating hydraulic pressure by operating a hydraulic piston by an electrical signal output in response to a displacement of the brake pedal or an electrical signal output from the electronic control unit, a hydraulic pressure control unit equipped with a plurality of flow paths and valves to control the hydraulic pressure transmitted from the hydraulic pressure supply device to the wheel cylinder, a pedal simulator, and a sub reservoir in which the pressurized medium is stored, the emergency module includes a hydraulic pressure auxiliary device operating when the hydraulic pressure supply device is inoperative to provide the hydraulic pressure to the wheel cylinder, the hydraulic pressure control unit includes a first hydraulic circuit that controls hydraulic pressure transmitted to a first wheel cylinder and a second wheel cylinder, and the connecting line includes a first connecting line connecting the master chamber and a front end of the first hydraulic circuit, a second connecting line directly connecting the master chamber and the pedal simulator, a third connecting line connecting the main reservoir and the sub reservoir, and a fourth connecting line connecting the emergency module to the third connecting line.

2. The electric brake system of claim 1, wherein the hydraulic pressure auxiliary device includes a first isolation valve and a second isolation valve allowing and blocking flows of the pressurized medium transmitted from the master cylinder and the hydraulic pressure supply device to the first wheel cylinder and the second wheel cylinder, respectively, a pump for pressurizing the pressurized medium, a motor for driving the pump, a first auxiliary hydraulic flow path for transmitting the pressurized medium pressurized by the pump to the first wheel cylinder, and a second auxiliary hydraulic flow path for transmitting the pressurized medium pressurized by the pump to the second wheel cylinder.

3. The electric brake system of claim 2, wherein the hydraulic pressure auxiliary device further includes a first auxiliary dump flow path for discharging the pressurized medium applied to the first wheel cylinder and a second auxiliary dump flow path for discharging the pressurized medium applied to the second wheel cylinder.

4. The electric brake system of claim 3, wherein the hydraulic pressure auxiliary device further includes:

a first support valve provided on the first auxiliary hydraulic flow path to control the flow of the pressurized medium and a second support valve provided on the second auxiliary hydraulic flow path to control the flow of the pressurized medium; and a first discharge valve provided on the first auxiliary dump flow path to control the flow of the pressurized medium and a second discharge valve provided on the second auxiliary dump flow path to control the flow of the pressurized medium.

5. The electric brake system of claim 4, wherein the first and second support valves and the first and second discharge valves are provided as normal-closed-type solenoid valves that are closed in normal times and operate to open upon receiving an electrical signal.

6. The electric brake system of claim 3, wherein the hydraulic pressure control unit further includes a second hydraulic circuit that controls hydraulic pressure transmitted to a third wheel cylinder and a fourth wheel cylinder.

7. The electric brake system of claim 6, wherein the hydraulic pressure auxiliary device is provided between the first and second wheel cylinders and the first hydraulic circuit.

8. The electric brake system of claim 6, wherein the master cylinder includes a first master piston connected to the brake pedal, a first master chamber whose volume is varied by a displacement of the first master piston, a second master piston provided to be displaceable by hydraulic pressure of the first master chamber, and a second master chamber whose volume is varied by a displacement of the second master piston, the first connecting line connects the first master chamber and the front end of the first hydraulic circuit, and the second connecting line connects the second master chamber and a front end of the pedal simulator.

9. The electric brake system of claim 6, wherein the electronic part further includes a dump controller provided between the hydraulic pressure supply device and the sub reservoir to control the flow of the pressurized medium.

10. The electric brake system of claim 9, wherein the hydraulic pressure supply device includes a first pressure chamber provided in front of the hydraulic piston and a second pressure chamber provided behind the hydraulic piston, and the electronic part further includes:

a first sub reservoir flow path connecting the sub reservoir and the first pressure chamber; and a second sub reservoir flow path connecting the sub reservoir and the second pressure chamber.

11. The electric brake system of claim 10, wherein the dump controller includes a first dump valve provided on the first sub reservoir flow path, a second dump valve provided on the second sub reservoir flow path, and a third dump valve provided in parallel to the second dump valve on the second sub reservoir flow path.

12. The electric brake system of claim 10, wherein the electronic part further includes a third sub reservoir flow path connecting the sub reservoir and a rear end of the first hydraulic circuit, and a fourth sub reservoir flow path connecting the sub reservoir and a rear end of the second hydraulic circuit.

13. The electric brake system of claim 12, wherein the electronic part further includes a simulation flow path connected to a rear end of the pedal simulator, and the simulation flow path is connected to the sub reservoir by joining the fourth sub reservoir flow path.

14. The electric brake system of claim 12, wherein the first hydraulic circuit includes a first inlet valve and a second inlet valve for controlling the flow of the pressurized medium supplied from the hydraulic pressure supply device to the first wheel cylinder and the second wheel cylinder, respectively, and a first outlet valve and a second outlet valve for controlling flows of the pressurized medium discharged from the first wheel cylinder and the second wheel cylinder, respectively, the second hydraulic circuit includes a third inlet valve and a fourth inlet valve for controlling the flow of the pressurized medium supplied from the hydraulic pressure supply device to the third wheel cylinder and the fourth wheel cylinder, respectively, and a third outlet valve and a fourth outlet valve for controlling the flow of the pressurized medium discharged from the third wheel cylinder and the fourth wheel cylinder, respectively, the pressurized medium discharged through the first and second outlet valves is supplied to the third sub reservoir flow path, and the pressurized medium discharged through the third and fourth outlet valves is supplied to the fourth sub reservoir flow path.

15. The electric brake system of claim 6, wherein the electronic part further includes a backup flow path connecting any one of the main reservoir and the sub reservoir to a front end of the second hydraulic circuit, a first cut valve provided in the first connecting line to control the flow of the pressurized medium, and a second cut valve provided on the backup flow path to control the flow of the pressurized medium.

16. The electric brake system of claim 2, wherein the first and second isolation valves are provided as normal-open-type solenoid valves that are open in normal times and operate to be closed upon receiving an electrical signal.

17. The electric brake system of claim 1, wherein the fourth connecting line connects an inlet of the pump and the first and second auxiliary dump flow paths to the third connecting line.

* * * * *